(12) United States Patent
Bucher et al.

(10) Patent No.: US 9,877,610 B2
(45) Date of Patent: Jan. 30, 2018

(54) GRILL

(71) Applicant: Sommerliving AG, Hergiswil (CH)

(72) Inventors: Armin Bucher, Hergiswil (CH); Marc Mathis, Meggen (CH)

(73) Assignee: SOMMERLIVING AG, Hergiswil (CH)

( * ) Notice: Subject to any disclaimer, the term of this patent is extended or adjusted under 35 U.S.C. 154(b) by 169 days.

(21) Appl. No.: 14/411,190

(22) PCT Filed: Jun. 17, 2013

(86) PCT No.: PCT/EP2013/062485
§ 371 (c)(1),
(2) Date: Dec. 24, 2014

(87) PCT Pub. No.: WO2014/001115
PCT Pub. Date: Jan. 3, 2014

(65) Prior Publication Data
US 2015/0182074 A1   Jul. 2, 2015

(30) Foreign Application Priority Data

Jun. 27, 2012 (CH) .................................. 0901/12
Aug. 16, 2012 (CH) .................................. 1372/12

(51) Int. Cl.
*A47J 37/07* (2006.01)

(52) U.S. Cl.
CPC ........... *A47J 37/07* (2013.01); *A47J 37/0713* (2013.01); *A47J 37/0786* (2013.01)

(58) Field of Classification Search
CPC .. F23M 3/12; F23M 3/14; F23M 3/18; F23M 3/22; F23M 9/00; F23M 9/06;

(Continued)

(56) References Cited

U.S. PATENT DOCUMENTS 4,909,235 A * 3/1990 Boetcker ................. F24C 1/16
                                                    126/25 C
5,347,978 A * 9/1994 Zuran .................. A47J 37/067
                                                    126/25 R (Continued)

FOREIGN PATENT DOCUMENTS

DE          9411524      10/1994
DE         19515080      10/1996

(Continued)

OTHER PUBLICATIONS

International Preliminary Report on Patentability dated Dec. 31, 2014 for PCT/EP2013/062485.

(Continued)

*Primary Examiner* — Tu B Hoang
*Assistant Examiner* — Vy Nguyen
(74) *Attorney, Agent, or Firm* — Paul D. Bianco; Lourdes Perez; Fleit Gibbons Gutman Bongini & Bianco PL

(57) ABSTRACT

The invention relates to a grill apparatus (1), in the lower part (2) of which there is provided a heat conducting cone (4) which is held in a central position and in which an adjustment cone is rotatably mounted. Both cones (4, 7) have heat conducting means (10) in the form of openings (41, 71). By means of a relative rotation of the two cones (4, 7) with respect to one another, said openings go from congruently completely open to completely closed and are adjustable to any intermediate position, whereby a heat conduction with more top heat or more bottom heat can be directed onto the object being grilled.

20 Claims, 4 Drawing Sheets

(58) Field of Classification Search
CPC .......... A47J 37/0652; A47J 37/0658; A47J 37/0664; F24C 1/00; F24C 1/16; F24C 15/32
USPC .... 99/425, 444, 446, 447; 126/25 R, 29, 38, 126/39 D, 294; 219/411
See application file for complete search history.

(56) References Cited

U.S. PATENT DOCUMENTS

| | | | |
|---|---|---|---|
| 5,355,868 A * | 10/1994 | Haen | A47J 37/0786 |
| | | | 126/153 |
| 5,413,090 A | 5/1995 | Mashburn et al. | |
| 5,453,574 A * | 9/1995 | Zuran | A47J 37/067 |
| | | | 126/25 R |
| 5,649,477 A | 7/1997 | Lingwood | |
| 5,722,388 A | 3/1998 | Butow et al. | |
| 6,213,006 B1 * | 4/2001 | Reardon | A47J 37/0704 |
| | | | 126/25 R |
| 2007/0119444 A1 | 5/2007 | Yoon et al. | |
| 2008/0169281 A1 * | 7/2008 | Borovicka | A47J 37/1295 |
| | | | 219/441 |
| 2009/0239187 A1 | 9/2009 | Johnston | |
| 2011/0252977 A1 * | 10/2011 | Sacherman | A47J 27/002 |
| | | | 99/401 |

FOREIGN PATENT DOCUMENTS

| | | | |
|---|---|---|---|
| EP | 653917 | 5/1995 | |
| EP | 688177 | 12/1995 | |
| GB | 1029774 A * | 5/1966 | .......... F23C 99/00 |
| WO | WO 9314352 A1 * | 7/1993 | .......... A47J 36/26 |
| WO | 9403093 | 2/1994 | |
| WO | 9420005 | 9/1994 | |

OTHER PUBLICATIONS

English translation of the International Preliminary Report on Patentability dated Dec. 31, 2014 for PCT/EP2013/062485.
Written Opinion of the International Search Authority dated Dec. 27, 2014 for PCT/EP2013/062485.
English translation of the Written Opinion of the International Search Authority dated Dec. 27, 2014 for PCT/EP2013/062485.
International Search Report dated Jul. 10, 2013 for PCT/EP2013/062485.
English translation of International Search Report dated Jul. 10, 2013 for PCT/EP2013/062485.

* cited by examiner

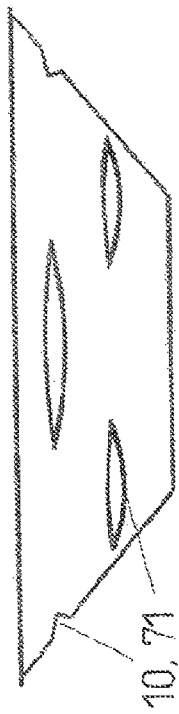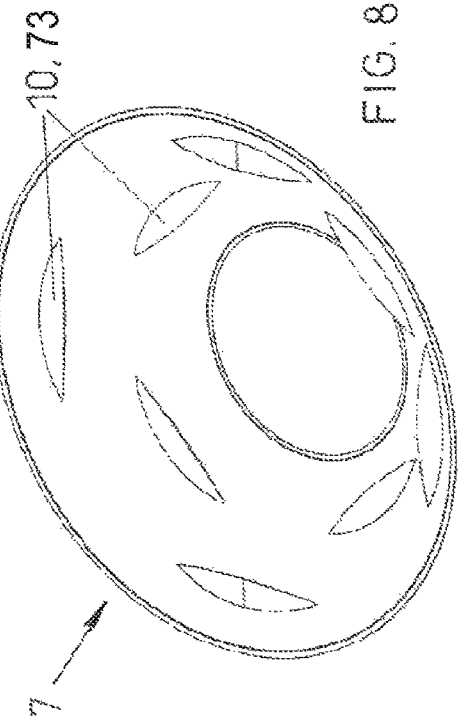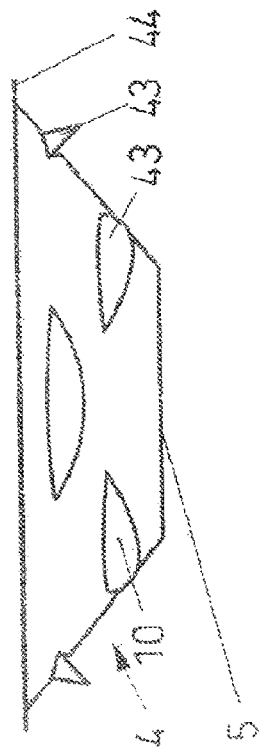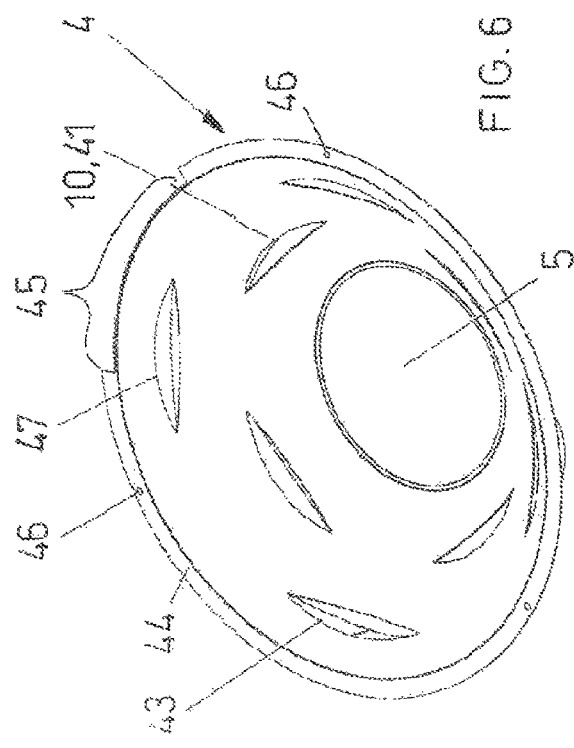

GRILL

FIELD OF THE INVENTION

The present invention pertains to a closable grilling apparatus that comprises a lower part with an annular gas burner arranged therein, a heat conducting cone that is held in the lower part above the gas burner such that it is spaced apart from the wall of the lower part and features a central bottom opening that is smaller than the inside diameter of the annular gas burner, as well as a cooking grate that is held in the lower part above the heat conducting cone and a hinged or removable cover.

BACKGROUND OF THE INVENTION

Grilling apparatuses of this type are known from EP 0653197, wherein these grills are commonly referred to, in particular, as so-called spherical grills and very widely used. The initially cited grilling apparatuses correspond to these known spherical grilling apparatuses. As the name implies, these grilling apparatuses have an approximately spherical external shape. The lower part has an approximately hemispherical shape whereas the cover is indeed curved, but not realized hemispherical.

The concept of a spherical grill is based on the notion that the heat generated by an annular gas burner, the inside diameter of which is greater than a central opening in a conducting cone held in the lower part, results in an approximately uniform heat distribution. The heat predominantly flows around the conducting cone and ascends along the outside of the wall of the conducting cone and the inside of the wall of the lower part until it reaches the cover such that the food being grilled is predominantly subjected to top heat. However, adequate bottom heat that usually suffices for cooking the food being grilled is also produced because the conducting cone is also heated by the annular gas burner. Nevertheless, it would be desirable to selectively supply heat from above or from below similar to a baking oven in order to respectively generate top heat or bottom heat.

EP-0688177 A discloses a grilling apparatus that may be realized in the form of an open or closed grilling apparatus and features a burner that is centrally arranged in the lower part, as well as a heat conducting means that makes it possible to adjust a different heat conduction, namely either in the form of uniform radiant heat that is generated by a plate being heated or in the form of a convective heat distribution that is achieved by raising parts of this plate, as well as the openings being formed thereby, such that heat can be conducted upward either more centrally or more radially depending on the adjustment.

However, other open or closed grilling apparatuses that allow a certain heat conduction are also known, for example, from DE 19515080 A or DE 9411524 U. Although these grilling apparatuses are also provided with annular burners, they have a completely different design and the burners used do not consist of gas burners.

As mentioned above, grilling apparatuses with gas burners of the initially mentioned type have a tendency to predominantly generate top heat such that the users accordingly open the cover and occasionally turn the food to be grilled in order to achieve uniform browning. However, this results in unnecessary energy losses and the constant turning of the food to be cooked also leads to increased soiling of the grilling apparatus.

Although EP 0653917 shows diverse variations that result in more top heat or more bottom heat, neither variation can be changed while the grilling apparatus is in use.

SUMMARY OF THE INVENTION

The present invention therefore is based on the objective of designing a grilling apparatus of the initially mentioned type in such a way that the food to be cooked can be alternately supplied with increased top heat or increased bottom heat during the operation of the grilling apparatus.

This objective is attained with a device according to the preamble of the independent claim by providing means that make it possible to conduct the heat of the gas burner either through or around the heat conducting cone in a progressively adjustable fashion such that food to be grilled lying on the cooking grate can be predominantly subjected to bottom heat by directing the heat through the conducting cone and predominantly subjected to top heat by directing the heat around the heat conducting cone.

In a particularly preferred embodiment, the grilling apparatus is realized in such a way that the means consist on the one hand of several openings that are arranged in the heat conducting cone over the circumference thereof and on the other hand of an adjustment cone with openings that is supported in the heat conducting cone in a sliding and contacting fashion, wherein the adjustment cone can be turned relative to the heat conducting cone such that the openings in the two cones can be adjusted more or less congruently between a completely closed position and a position, in which they lie on top of one another in a completely congruent fashion, depending on the relative rotation of the adjustment cone to the heat conducting cone.

BRIEF DESCRIPTION OF THE DRAWINGS

The dependent claims define other advantageous embodiments of the inventive object, the significance and function of which are elucidated below with reference to the attached drawings. The drawings show a preferred exemplary embodiment of the inventive object. In these drawings:

FIG. 1 shows a side view of a closable grilling apparatus with open cover that is arranged on a mobile base and FIG. 2 shows a rear view of the same grilling apparatus with mobile base, whereas

FIG. 5 shows a side view of the heat conducting cone and

FIG. 6 shows a perspective representation thereof. Likewise,

FIG. 7 shows a side view of the adjustment cone and

FIG. 8 shows a perspective representation thereof.

FIG. 9 shows a side view of an alternative design of the heat conducting cone and FIG. 10 shows a top view thereof, whereas

DETAILED DESCRIPTION OF THE INVENTION

Figure 1:
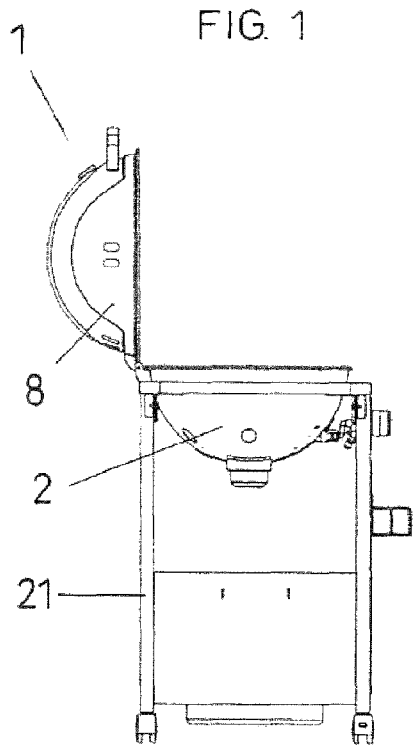
Figure 2:
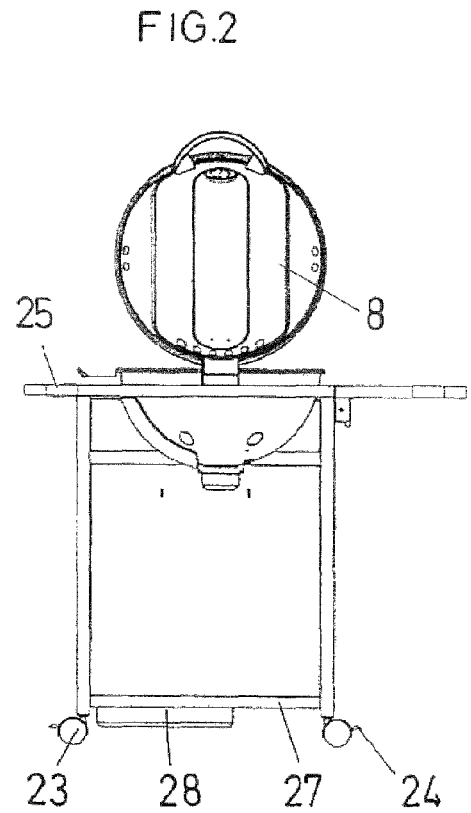
Figure 3:
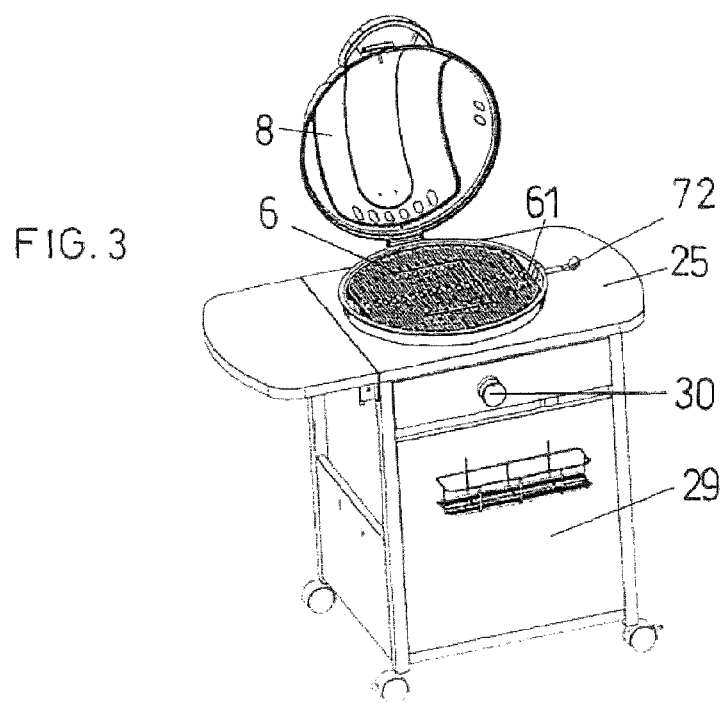
FIG. 3 shows a perspective view of the same grilling apparatus with base.

The actual grilling apparatus is identified by the reference symbol 1. It consists of a closable grilling apparatus that comprises a lower part 2 and a cover 8 illustrated in the completely open position. The grilling apparatus 1 can be completely closed by means of the cover and is accordingly referred to as a closable grilling apparatus in this description. In FIGS. 1 to 3, the grilling apparatus 1 is supported on a mobile base. The mobile base consists of a frame construction 21 with 4 legs and casters 23 that are fixed on said legs and, for example, may be provided with locking means 24. The mobile base 20 is covered with a heat-resistant support 25 that contains a circular receptacle opening, in which the lower part of the grilling apparatus 1 is supported. The space remaining underneath the lower part 2 of the grilling apparatus 1 is relatively large and on its lower end defined by a bottom 27 and a recessed trough 28, in which a not-shown gas tank may be arranged. The reference symbol 29 identifies the front cover and a control knob 30 for adjusting the gas supply to the gas burner protrudes from said front cover.

Figure 4:
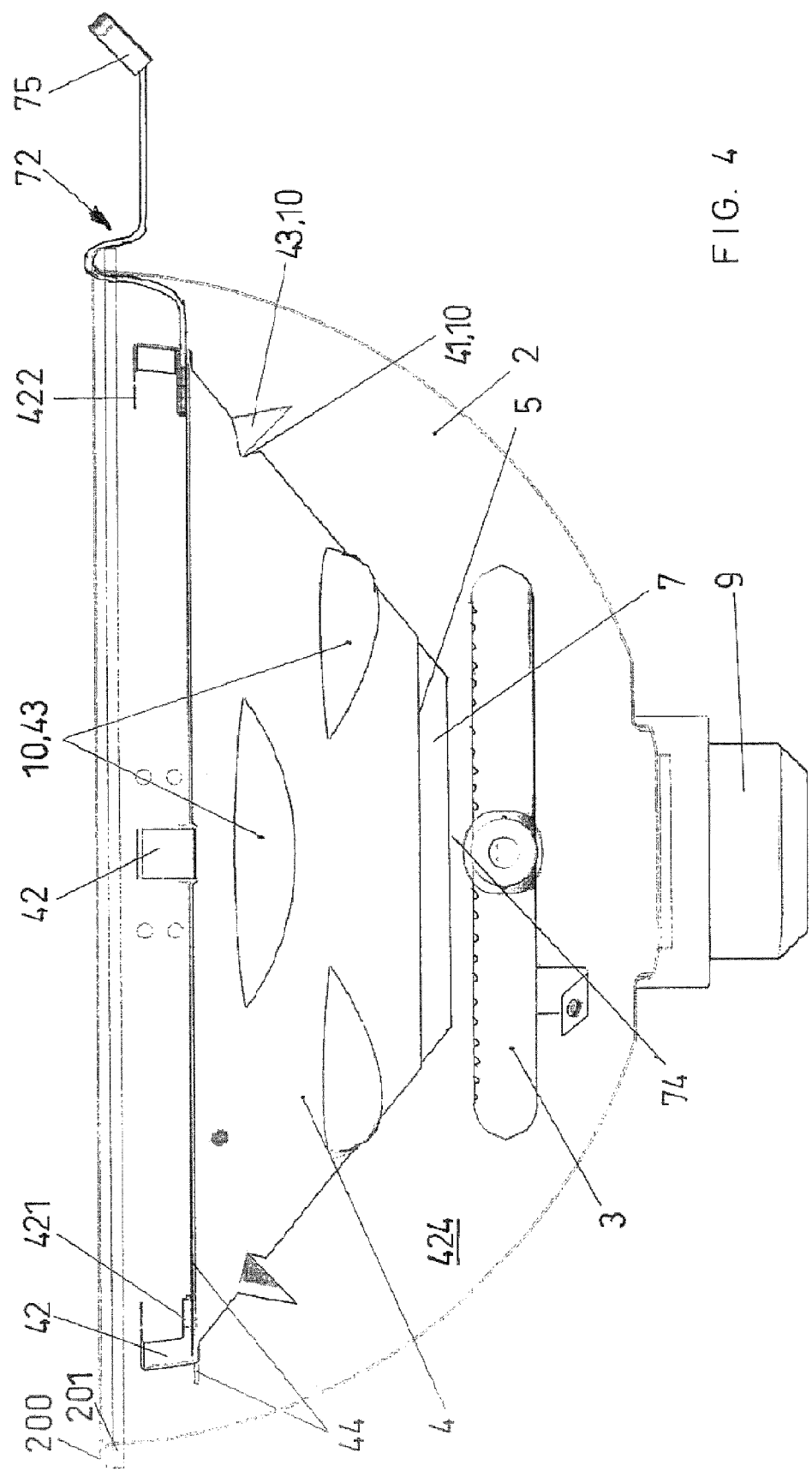
FIG. 4 shows the grilling apparatus without the mobile base and without the cover, wherein the lower part of the grilling apparatus is illustrated in the form of a diametrical section and the other parts of the grilling apparatus are illustrated in the form of a side view.

FIG. 3 shows an oblique perspective view of the grilling apparatus with the mobile base, as well as the grate 6 that is not visible in FIGS. 1 and 2 and was omitted in FIG. 4 in order to provide a better overview.

In the grilling apparatus shown in FIG. 4, only the lower part is illustrated in the form of a section and the parts situated therein are illustrated in the form of a side view. The lower part 2 has a hemispherical shape and its upper edge 200 features a bead 201. The heat conducting cone 4 in the lower part 2 is illustrated in the form of a side view. An annular gas burner 3 is situated under the heat conducting cone. The conducting cone 4 features a lower central opening 5, the diameter of which is smaller than the inside diameter of the annular gas burner 3. The heat conducting cone 4 situated adjacent to its upper edge features on the wide opening a horizontal collar 44, to which approximately u-shaped brackets 42 are attached, wherein one limb of said brackets extends parallel to the horizontal collar 44 and is rigidly connected thereto and an upper limb 422 extends parallel thereto. The upper parallel limb 422 serves for supporting the grate 6 that is not illustrated in this figure. The crosspiece 423 connecting the two limbs 421 and 422 is inclined in the direction parallel to the inner wall 424 of the lower part 4 in the region, in which the aforementioned crosspiece 423 of the bracket 42 contacts the inner wall of the lower part. This figure furthermore shows the heat conducting means 10. In principle, these means in the form of openings 41 in the conducting cone are only indicated schematically in the uppermost lateral regions. In the side view shown, the openings 41 are covered by air deflecting caps 43. In FIGS. 5 and 6, the heat conducting cone 4 is illustrated separately in the form of a side view (FIG. 5) and in the form of an oblique perspective view from above (FIG. 6). The brackets 42 are not illustrated in this figure. However, three mounting holes 46 for attaching the bracket 42, for example, by means of a slot are illustrated in the horizontal collar 44. Only three brackets 42 are provided for achieving a secure three-point support. FIG. 6 furthermore shows that the horizontal collar 44 has an interruption 45. This is discussed in greater detail below. FIG. 6 also shows some of the openings 41, wherein the inside of the air deflecting caps 43 is also visible more or less clearly in this figure depending on the viewing angle.

The heat generated by the flames of the gas burner 3 essentially ascends along the outer side of the heat conducting cone 4. The flow of heated air is now deflected into the interior of the heat conducting cone 4 through the aforementioned openings 41 by the air deflecting caps 43. The air deflecting caps 43 may be realized in the form of crescent-shaped sheet metal parts as shown and merely welded to the outside along the upper edge 47. In this way, these air deflecting caps 43 can be realized larger than the actual openings 41. However, it is also possible to realize these air deflecting caps 43 in such a way that only the lower edge of the opening 41 is punched and the upper edge 47 is formed by a region of the wall 424 produced of the heat conducting cone 4.

The brackets 42 are designed so large that the clearance between the horizontal collar 44 and the inner wall 424 of the lower part 2 is bridged and a sufficient gap remains for conducting the generated heat around the horizontal collar 44 of the heat conducting cone 4 without creating relevant heat accumulation.

An adjustment cone 7 rests in the heat conducting cone 4 and is only partially visible in FIG. 4. With respect to its conicality, the adjustment cone 7 is realized identical to the conducting cone 4. Accordingly, the adjustment cone 7 can be placed into the heat conducting cone 4 such that its outer side lies on the inner side of the heat conducting cone 4. The adjustment cone 7 may approximately have the same structural height as the heat conducting cone 4. However, it is preferably slightly higher such that the adjustment cone 7 slightly protrudes from the bottom of the heat conducting cone 4 in the inserted state as illustrated in FIG. 4. However, the adjustment cone could, in principle, also have a smaller height than the heat conducting cone. The adjustment cone 7 also features means 10 for conducting the heat from the gas burner 3 through the heat conducting cone 4. These means 10 are likewise realized in the form of openings that are identified by the reference symbol 71. With respect to their size, arrangement or position and shape, these openings 71 are realized at least approximately identical to the corresponding openings 41 in the heat conducting cone. Drip deflectors 73 are integrally formed on each upper edge of the openings 71, wherein these drip deflectors are, in contrast to the heat conducting cone 4, integrally formed on the inner wall surface in this case. As the name implies, the drip deflectors 73 serve, in particular, for deflecting fat dipping onto the wall of the adjustment cone 7 from the food to be grilled on the grate 6 around the openings 71 such that it is prevented from respectively dripping onto the inner wall of the lower part between the heat conducting cone 4 and the outer side of the adjustment cone 7 in the closed state or through the openings 71 in the adjustment cone and the more or less congruently positioned openings 41 in the heat conducting cone in the open state. In fact, this dripping fat reaches the lower part 2 through the lower central opening 74 in the adjustment cone 7 and ultimately drains into a collection trough 9. The maximum diameter of the central opening 5 in the heat conducting cone 4 or the central opening 74 in the adjustment cone 7 is smaller than the inside diameter of the gas burner 3 such that the dripping fat is reliably prevented from reaching the gas burner.

A handle bracket 72 is integrally formed on the adjustment cone 7. This handle bracket extends upward from the adjustment cone 7 across the clearance between the adjustment cone and the wall of the lower part 2, namely approximately along this wall, and then outward over the edge 200 in the shape of an arc in a practically form-fitted fashion. On its outer end, a handle 75, preferably of insulating material, is attached to the handle bracket 72.

The adjustment cone 7 can be turned in the heat conducting cone 4 by means of the handle bracket 72 that can also be operated in the closed state of the grilling apparatus 1 because it extends between the lower part 2 and the cover 8. Depending on the relative position between the heat conducting cone and the adjustment cone, the openings 41 in the heat conducting cone and the openings 71 in the adjustment cone are positioned more or less congruently on top of one another. In this case, the adjusting range is chosen such the openings 41 and 71 do not overlap at all at one end of the adjusting range and the heat ascending from the gas burner 3 therefore is entirely conducted around the heat conducting cone. In this case, the heat ascends in the region between the heat conducting cone and the inner wall 424 of the lower part 2 and around the horizontal collar 44 such that it reaches the space bordered by the cover 8 and the food to be grilled lying on the grate 6 is predominantly exposed to top heat. If a user takes hold of the handle 75 and displaces the adjustment cone 7 to the other end of the adjusting range by means of the handle bracket 72, the openings 41 in the heat conducting cone are moved into a position, in which they completely overlap the openings 71 in the adjustment cone such that maximum heat conduction through the heat conducting cone takes place. The ascending heat is optimally conducted through the aforementioned openings by the air deflecting caps 43 and predominantly ascends in the inner region of the heat conducting cone and the adjustment cone such that it directly reaches the underside of the food to be grilled lying on the grate 6. In this case, the food to be grilled is predominantly exposed the bottom heat. Any intermediate positions naturally can be adjusted by means of the handle bracket 72. Since the handle bracket 72 extends between the lower part and the cover as already mentioned above, this adjustment can also be carried out without opening the cover 7. The adjusting range is defined by the interruption 45 in the horizontal collar 44 of the heat conducting cone 4. When the handle bracket 72 contacts one edge of the interruption 45, one defined end position is reached whereas the other above-described end position is reached by displacing the handle bracket and therefore the adjustment cone 7 until the handle bracket contacts the other edge of the interruption 45. The grate 6 is also provided with a corresponding recess 61 in order to ensure that the handle bracket 72 does not get jammed on the grate.

Figure 9:
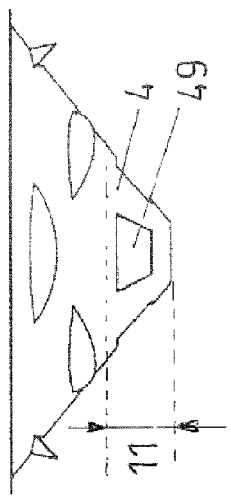
Figure 10:
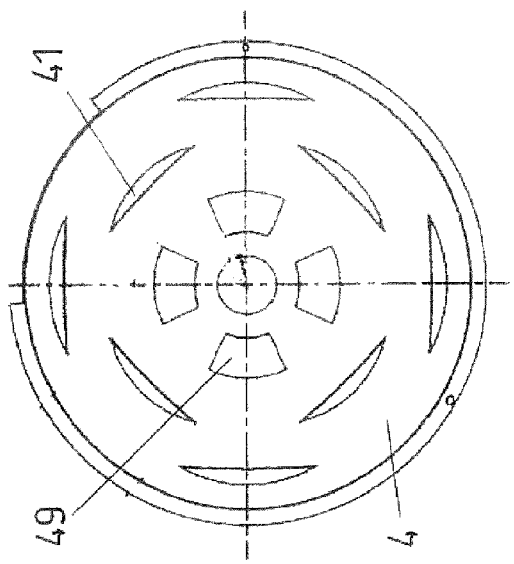
Figure 11:
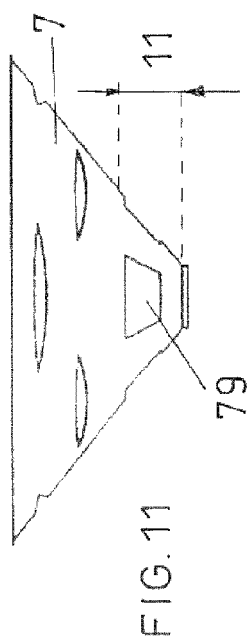
FIG. 11 shows a side view of an alternative adjustment cone for the heat conducting cone according to FIGS. 9 and 10 and FIG. 12 shows a top view thereof.
Figure 12:
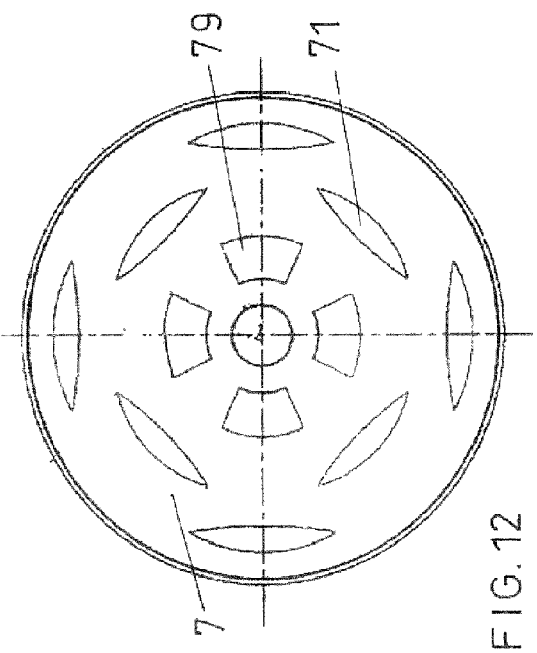

It should ultimately also be noted that it is possible to realize the heat conducting cone 4 and the adjustment cone 7 so long that their lower ends can extend through the annular gas burner 3. This variation is illustrated in FIGS. 9-12. FIGS. 9 and 10 show this alternative embodiment of the heat conducting cone 4 and FIGS. 11 and 12 show the corresponding embodiment of the adjustment cone 7. However, this variation is associated with the risk of heat accumulation. This heat accumulation can be prevented by either providing slots or the slot-shaped windows shown as additional heat conducting means 10 in the lowermost region on the bottom ends of both cones 4, 7. These additional heat conducting means 10 are arranged in the lowermost region 11 of the two cones 7 and 10. These means are realized in the form of rectangular or slot-shaped window openings. The window openings in the heat conducting cone 4 are identified by the reference symbol 49 and the window openings in the adjustment cone are identified by the reference symbol 79.

The size of the window openings 49, 79 is also chosen such that the window openings can be adjusted between the completely closed position, in which the window openings 49 and 79 in the two cones do not overlap one another, and the completely open position, in which the window openings 49, 79 practically lie congruently on top of one another, within the potential range of relative rotation between the two cones. Any intermediate position can also be adjusted.

In contrast to the above-described openings 41 and 71 that are provided with air deflecting caps 43 and drip deflectors 73, such air deflecting caps or drip deflectors are not required on the means 10 in the region 11.

It should furthermore be noted that an annular gas burner does in this context by no means have to refer to a circular arrangement. In fact, this term refers to a gas burner that extends around the central opening 5 of the heat conducting and/or adjustment cone in an arbitrary shape.

LIST OF REFERENCE SYMBOLS

1 Grilling apparatus
2 Lower part
21 Edge of lower part
3 Gas burner
4 Heat conducting cone
5 Central opening
6 Grate
7 Adjustment cone
8 Cover
9 Drip trough
10 Heat conducting means
11 Lowermost region of heat conducting and adjustment cone
20 Mobile base
21 Frame construction
22 Legs
23 Casters
24 Locking means
25 Support
26 Front panel
27 Bottom
28 Recessed trough
29 Front cover
30 Control knob
200 Upper edge
201 Bead
41 Opening in heat conducting cone
42 Brackets on heat conducting cone
43 Air deflecting caps
44 Horizontal collar
45 Interruption
46 Mounting holes
47 Upper edge of opening 41
48 Lower edge of opening 41
49 Window opening in heat conducting cone
421 Limb extending parallel to 4
422 Limb
423 Crosspiece
424 Inner wall of lower part
61 Recess on grate
71 Opening in adjustment cone
72 Handle bracket
73 Drip deflector
79 Window opening in adjustment cone

The invention claimed is:
1. A closable grilling apparatus comprising:
a lower part having an annular gas burner arranged therein;
a heat conducting cone arranged in the lower part above the annular gas burner having a central bottom opening smaller than an inside diameter of the annular gas burner, the heat conducting cone positioned spaced apart from a wall of the lower part;
openings arranged in the heat conducting cone around a circumference thereof, each of the openings formed in a crescent shape;

a cooking grate arranged in the lower part above the heat conducting cone;

a removable cover;

an adjustment cone supported by and arranged within the heat conducting cone;

openings arranged in the adjustment cone around a circumference thereof; and air deflecting caps integrally formed on an upper edge of the openings in the heat conducting cone and directed away from a center of the heat conducting cone, the air deflecting caps configured for deflecting ascending hot air inward through the heat conducting cone when the openings are positioned to at least partially overlap with the openings in the adjustment cone;

wherein the openings arranged in the heat conducting cone and the openings arranged in adjustment cone are positioned for adjustably conducting heat from the annular gas burner through the cones or around an outside surface of the heat conducting cone, such that food to be grilled lying on the cooking grate is predominantly subjected to bottom heat by conducting heat through the cones and food to be grilled lying on the cooking grate is predominantly subjected to top heat by conducting heat around the outside surface of the heat conducting cone.

2. The closable grilling apparatus according to claim 1, wherein the removable cover is hinged.

3. The closable grilling apparatus according to claim 1, wherein the adjustment cone is slidably supported within the heat conducting cone.

4. The closable grilling apparatus according to claim 3, wherein the adjustment cone is positioned to be turned, relative to the heat conducting cone, such that the openings in the two cones can be adjusted between a completely closed position and a congruent position, depending on relative rotation of the adjustment cone to the heat conducting cone.

5. The closable grilling apparatus according to claim 1, wherein the lower part has a rotationally symmetrical shape.

6. The closable grilling apparatus according to claim 1, further comprising a handle bracket integrally formed on the adjustment cone, the handle bracket encompassing an upper edge of the lower part and outwardly extending between the lower part and the removable cover.

7. The closable grilling apparatus according to claim 1, further comprising drip reflectors integrally formed on the adjustment cone, the drip reflectors positioned above the openings and directed toward a center of the adjustment cone.

8. The closable grilling apparatus according to claim 7, wherein each of the openings in the adjustment cone are formed in a crescent shape and the drip reflectors are formed by bending part of the crescent shape down towards the center of the adjustment cone.

9. The closable grilling apparatus according to claim 1, wherein the air deflecting caps are bent outward from the center of the heat conducting cone.

10. The closable grilling apparatus according to claim 1, wherein the heat conducting cone comprises a collar on an upper edge, the collar horizontally protruding from the heat conducting cone.

11. The closable grilling apparatus according to claim 10, wherein the collar comprises an interruption, a length of the interruption defining an adjusting range for the adjustment cone.

12. The closable grilling apparatus according to claim 11, wherein the length of the interruption corresponds to a maximum size of the openings in an adjustment direction.

13. The closable grilling apparatus according to claim 11, further comprising a handle bracket integrally formed on the adjustment cone, the handle bracket overlapping the heat conducting cone in a region of the interruption on the collar.

14. The closable grilling apparatus according to claim 1, wherein the heat conducting cone further comprises slot-shaped window openings in a lowermost region.

15. The closable grilling apparatus according to claim 1, wherein the adjustment cone further comprises slot-shaped window openings in a lowermost region.

16. A closable grilling apparatus comprising:

a lower part having an annular gas burner arranged therein;

a heat conducting cone arranged in the lower part above the annular gas burner having a central bottom opening smaller than an inside diameter of the annular gas burner, the heat conducting cone positioned spaced apart from a wall of the lower part;

openings arranged in the heat conducting cone around a circumference thereof;

a cooking grate arranged in the lower part above the heat conducting cone;

a removable cover;

an adjustment cone supported by and arranged within the heat conducting cone;

openings arranged in the adjustment cone around a circumference thereof; and air deflecting caps integrally formed on an upper edge of the openings in the heat conducting cone and directed away from a center of the heat conducting cone, the air deflecting caps configured for deflecting ascending hot air inward through the heat conducting cone when the openings are positioned to at least partially overlap with the openings in the adjustment cone;

a collar on an upper edge of the heat conducting cone, the collar protruding horizontally from the heat conducting cone; and an interruption in the collar, a length of the interruption defining an adjustment range for the adjustment cone;

wherein the openings arranged in the heat conducting cone and the openings arranged in adjustment cone are positioned for adjustably conducting heat from the annular gas burner through the cones or around an outside surface of the heat conducting cone, such that food to be grilled lying on the cooking grate is predominantly subjected to bottom heat by conducting heat through the cones and food to be grilled lying on the cooking grate is predominantly subjected to top heat by conducting heat around the outside surface of the heat conducting cone.

17. The closable grilling apparatus according to claim 16, wherein the length of the interruption corresponds to a maximum size of the openings in an adjustment direction.

18. The closable grilling apparatus according to claim 16, further comprising a handle bracket integrally formed on the adjustment cone, the handle bracket overlapping the heat conducting cone in a region of the interruption on the collar.

19. The closable grilling apparatus according to claim 16, wherein the adjustment cone is slidably supported within the heat conducting cone.

20. The closable grilling apparatus according to claim 19, wherein the adjustment cone is positioned to be turned, relative to the heat conducting cone, such that the openings in the two cones can be adjusted between a completely closed position and a congruent position, depending on relative rotation of the adjustment cone to the heat conducting cone.

* * * * *